Figure 1:
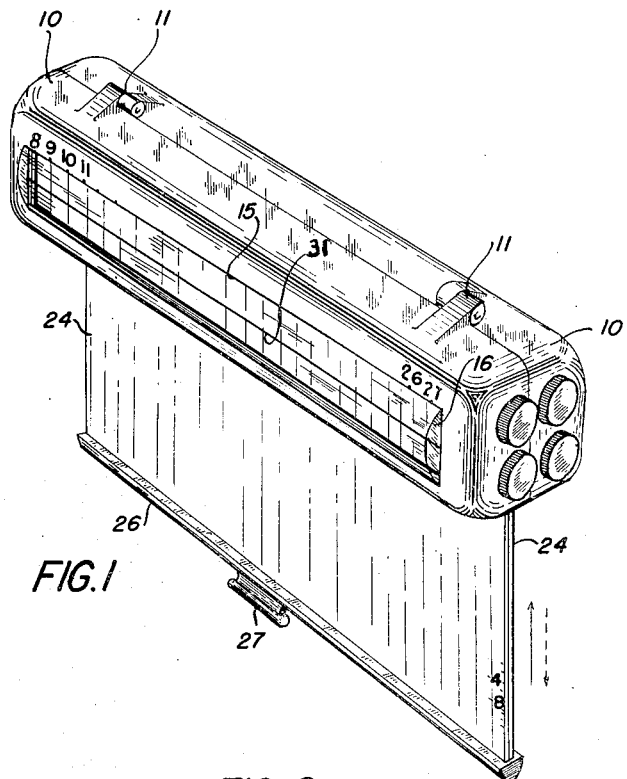

Nov. 1, 1949.                    J. A. CHAUSSE                    2,486,463
                          COMPUTING INDICATING DEVICE
Filed July 25, 1947                                    2 Sheets-Sheet 1

INVENTOR.
JOSEPH A. CHAUSSE
BY Ray F. Stewart
his ATTY.

Nov. 1, 1949.                J. A. CHAUSSE                2,486,463
                         COMPUTING INDICATING DEVICE
Filed July 25, 1947                                    2 Sheets-Sheet 2
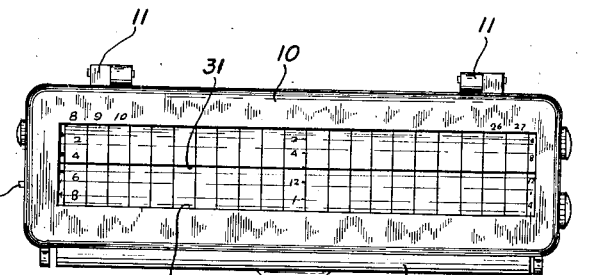
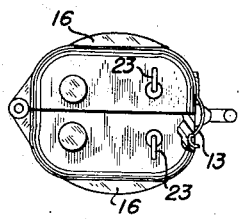
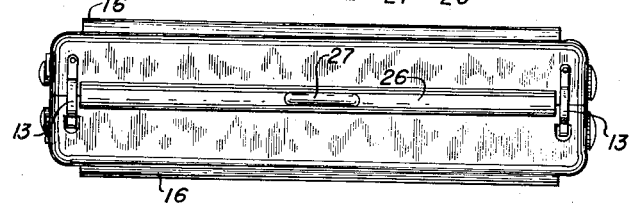
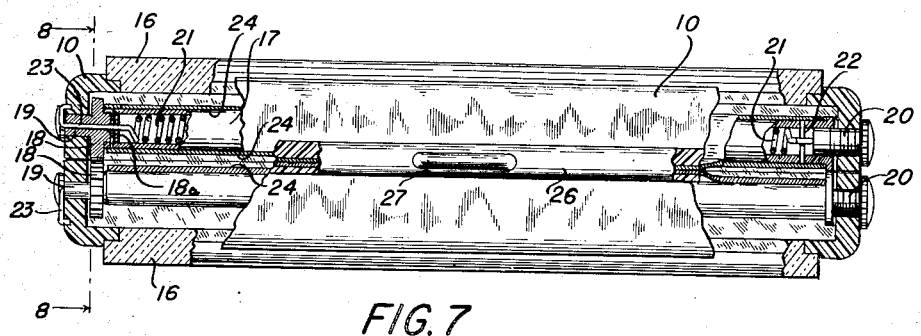
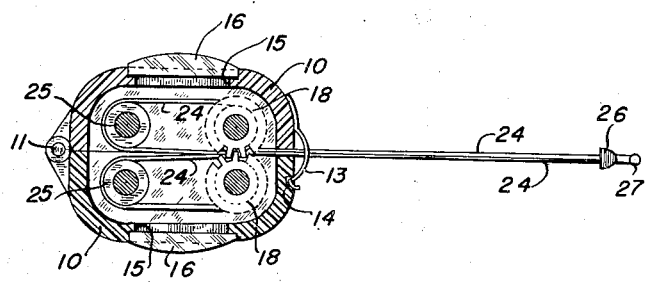
INVENTOR.
JOSEPH A. CHAUSSE
BY
his ATTY.

Patented Nov. 1, 1949

2,486,463

UNITED STATES PATENT OFFICE 2,486,463

COMPUTING INDICATING DEVICE

Joseph A. Chaussé, Meriden, Conn.

Application July 25, 1947, Serial No. 763,485

6 Claims. (Cl. 235—86)

This invention relates to a computing indicator; and it relates more particularly to a device of this general character which is especially well adapted, by reason of its small bulk and compactness, to be used by shoppers or purchasers of merchandise in retail stores, for quickly verifying the correctness of the total cost of a given quantity of merchandise announced by the sales person or clerk, on the basis of the number of quantity units involved and the stated price per unit. A notably useful specific embodiment of the invention enables the shopper to quickly check the announced total cost of commodities sold at various prices per pound, or other measure, and such an embodiment will be more particularly referred to and described hereinafter by way of example in explaining the principles of the invention.

Although the customer can usually observe the actual weight of the commodity being purchased, he or she is not ordinarily in a position to compute the total cost of it quickly, except where the indicated weight is a whole number of pounds. It is the general tendency of customers, therefore, to accept the clerk's quick calculation as correct, whether this tendency be due to careless indifference on the part of the customer or to hesitancy about getting into an embarrassing argument with the sales clerk.

Accordingly it is of substantial advantage to the customer to have at hand some dependable means by which, knowing the weight of the commodity and the price per pound, he can quickly and accurately determine the proper charge for his purchase and avoid being overcharged. Such means must, of course, be small enough to be conveniently carried by the housewife in her shopping bag. At the same time it must be quite accurate and simple in operation, as well as inexpensive to manufacture.

Devices heretofore proposed for this general purpose have been characterized by many disadvantages, including relatively large size, as well as complexity, and consequent excessive cost of manufacture, which make them entirely impractical.

Figure 2:
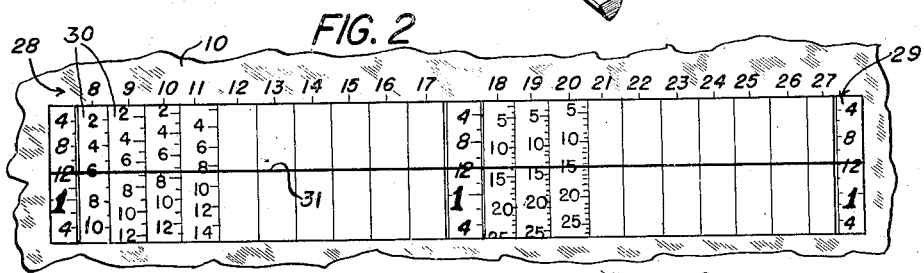
Figure 3:
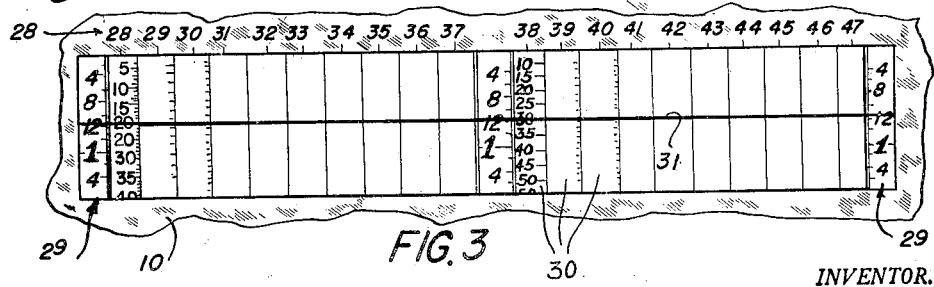

The present invention overcomes these objections by providing a device having a novel arrangement of parts whereby an extremely compact and relatively inexpensive unit is obtained. It is designed to permit the user to correlate rapidly an observed weight, or other measure of goods purchased, with a known cost per unit of measure, and thus to enable the total cost of such purchase to be read directly on the indicator. In the present instance, the indicator device may take the form of a generally rectangular, shallow case which is sufficiently small to be easily held in the palm of one hand. Viewing windows or sight openings extending longitudinally in two opposite faces permit the user to observe the tabulations printed on indicia web means mounted within the device and movable transversely of such windows from outside the case to permit the user to bring a desired portion into registry with the windows. By employing a double web having indicia bearing portions in back-to-back relation, one portion being visible through a window in one side while the other is visible through the opposite window, a considerably extended range of cost indication is obtained without sacrificing small size and compactness. Also, by providing each of the viewing windows with a magnifying lens, the amount of indicia printed on the webs may be greatly increased without causing undue difficulty in reading by the user. Further advantages of the device will become apparent in connection with the description of the embodiment of the invention set forth in detail hereinafter and shown by way of example in the accompanying drawings, in which Fig. 1 is a view in perspective of the device, with the indicia webs partially withdrawn from the case;

Figs. 2 and 3 are fragmentary views of opposite faces of the device in Fig. 1 showing certain parts in greater detail;

Figs. 4, 5, and 6 are views in plan, side elevation and end elevation, respectively;

Fig. 7 is a view in side elevation, on an enlarged scale, parts being broken away to show certain details of construction; and Fig. 8 is a view in cross-section taken along line 8—8 of Fig. 7.

Referring now to the drawings, the present device is a box-like structure consisting of two similar sections 10 hinged together along a rear face by hinges 11, the edges of the two sections abutting at the rear and along the ends of the box, but leaving a slot 12 extending longitudinally along the front face. The two sections 10 are normally retained in their abutting positions by a spring clip or clips 13 secured to the front edge of one of the sections of the unit, near the ends thereof, and retentively engaged in a depression 14 formed in the adjacent edge of the other section of the unit. Each of sections 10 is provided with a longitudinally extending window or sight opening 15 in which is set a lens 16. Rotatably supported within the casing of the unit and adjacent the front thereof are a pair of spring rolls 17 each having a gear 18 secured at one end by a pin 18a. When the casing of the unit is closed, as shown in Figs. 7 and 8, gears 18 are caused to intermesh and thus connect rolls 17 together so that the rotation of one will cause an equal rotation of the other. Gears 18 are each provided with a stem 19 which is journaled for rotation within its respective section 10 of the casing. At their opposite ends, rolls 17 are each rotatably carried by a stud 20 which projects through the end of the casing. Each of rolls 17 is hollow and contains a helically wound spring 21, one end of which is secured, adjacent studs 20, to a pin 22 passing through the roll. At its other end, spring 21 is provided with a stem 23 which projects axially through gear 18 and is then bent back upon itself to engage a hole drilled in the casing of the unit. It will be seen, therefore, that since one end of each of springs 21 is secured to the casing, rotation of the rolls (in one direction) causes a tension to be set up in the springs thus tending to turning the rolls back to their original position. Each of the rolls 17 carries a web or belt 24 of paper, for example, this belt being secured at one of its ends to its respective rolls 17 and being trained around a cooperating guide or idler roll 25 adjacent the rear face of the box and brought forward through slot 12 and secured at its other end to an actuating bar 26 normally engaged in the slot. This bar is provided with a projecting knob or finger grip 27, by means of which the two webs, thus united at their adjacent outer ends, can be simultaneously pulled outwardly through slot 12 to bring the desired portion of the web into view behind one or the other of the windows 15. As this is done, the rolls are of course caused to rotate by the unwinding of the webs, thereby increasing the tension of coil springs 21, so that, when knob 27 is released, the webs are immediately wound back upon the rolls 17 until stopped by engagement of bar 26 in slot 12.

Along a longitudinal edge of each of the windows 15 is a scale 28 which in this case indicates price per pound, the range here shown by way of example extending from eight to forty-seven cents per pound, with the scale being divided equally between opposite sides of the unit, as indicated in Figs. 2 and 3. Each web 24 carries at one or more places (three in this instance) across its width a longitudinally extending weight scale 29, here indicated as reading in ounces and pounds; while the remaining space is divided into longitudinally extending total-cost scales 30, one for each price per pound indicated in scale 28, showing the total cost for each indicated weight at the applicable price per pound. As the average purchaser at a retail store seldom buys more than ten pounds of fruit or vegetables at a time, the calibration of the weight scales on the webs may be correspondingly limited. At the same time, of course, the range of unit prices indicated in scales 28 may be varied to suit the particular normal range of prices encountered by the purchaser.

In use, the purchaser observes the weight shown on the store scales, then pulls out the actuating knob or bar 26 sufficiently to bring the corresponding weight indication along the lateral edge of one or the other of the two webs into registry with a hair line 31 provided on the rear face of each of the lenses 16 so as to be adjacent the cooperating web. Then, on such web, in the column 30 under the applicable price per pound, the exact total cost of the goods purchased can be read off directly behind the hair line. For example, assume that the weight of the merchandise being purchased is twelve ounces; web 24 is pulled out of the case until, on scale 29, the figure "12" indicating twelve ounces comes into registry with hair line 31 (see Figs. 2 and 3). If the unit cost per pound is eight cents, for example, the purchaser looks on the scale 30 in the column under the figure "8" in scale 28 and finds that the hair line 31 crosses this scale at a point marked "6," which indicates, of course, that the total cost of the merchandise is six cents. Similarly, the total cost of this same weight of goods at twenty cents per pound is read as fifteen cents under the reference line. If the unit price at which the goods are being sold exceeds twenty-seven cents per pound in the present example, the indicator is turned over and the total costs for goods selling up to 47 cents per pound can be obtained. As previously mentioned, the range of prices and/or weights or other units of measure which the indicator is to be adapted to handle may be varied as desired, as well as the increments into which these various ranges are divided.

It can be seen from the foregoing description that an obvious modification may be the elimination of the coil spring 21 in one of rolls 17, since intermeshing gears 18 afford means for positively maintaining constant the angular rotational relationship of said rolls one to the other. On the other hand, gears 18 are not an indispensable feature of the invention; for, where springs 21 are employed in both rolls 17, said gears may be entirely dispensed with and the action of the springs alone relied upon to accomplish proper operation of the indicia web means, thus both simplifying the construction and reducing the cost of manufacture.

It will be apparent that the invention provides a relatively simple and inexpensive device so constructed that, despite its conveniently small size and compactness, it is operable by a single movement of a unitary actuating member to give a desired indication of coordinated relationship among a plurality of numerical quantities, all of which are variable within rather wide limits. This is accomplished in accordance with the invention by prividing movable web means bearing indicia of all but one of said quantities and composed of a plurality of lengths or sections of web mounted within an enclosing casing having a corresponding plurality of sight openings in its walls in such manner that, by means of an actuating member connected to each section and located outside the casing, the web sections may be simultaneously moved across their respective sight openings, each section moving across one sight opening only; and by providing adjacent each sight opening, in proper correlation to the indicia on the web section moving thereunder, indicia representing only a corresponding portion of the range of values over which the remaining numerical quantity is variable.

What is claimed is:

1. A computing indicator device comprising, in combination, a casing having sight openings in opposite sides thereof and a slot between said openings, separate sets of web-supporting rolls mounted within said casing, one set adjacent each sight opening, flexible double web means composed of separate indicia-bearing lengths of web, each trained about one of said set of rolls for movement operatively adjacent the corresponding sight opening and joined with the other web length to bring said lengths into substantially tangent back-to-back relation with their indicia-bearing surfaces facing each other at a location intermediate said sets of rolls and into alignment with said slots, unitary web-actuating means disposed outside the casing, connected to said double web means adjacent the junction of said separate lengths thereof and manually operable to withdraw the same, in said back-to-back relation, through said slot in order to move different portions of the indicia on both said web lengths into registry with the respective sight openings, and roll-actuating means operatively associated with the rolls of both sets for retracting said web lengths into said casing.

2. A computing indicator device as defined in claim 1, in which a roll of one set is geared to a roll of the other set for rotation at the same speed, said roll-actuating means comprising resilient means associated with at least one of the rolls thus geared together, constantly acting to yieldingly oppose withdrawal of the web portions through said slot and operating automatically to retract the same into the casing upon release of said actuating means.

3. A computing indicator device as defined in claim 1, adapted to indicate total costs of different quantities of merchandise within a given quantity range at different prices per unit quantity within a given price range, wherein the indicia on said web lengths are arranged in columns extending longitudinally thereof, the indicia carried by each of said web lengths including the entire given quantity range together with total costs corresponding to only a part of the given price range; while the casing is provided, adjacent each sight opening and in proper registry with the corresponding total cost columns on the cooperating web length, with a scale indicating the corresponding portion of the given price range.

4. A computing indicator device as defined in claim 1, in which said roll-actuating means includes resilient means associated with a roll of each of said sets, constantly acting to yieldingly oppose withdrawal of the web lengths through said slot and operating automatically to retract the same into the casing upon release of said actuating means.

5. A computing indicator device as defined in claim 4, wherein the rolls with which the resilient means are associated are geared together for rotation at the same speed.

6. A computing indicator device as defined in claim 4, adapted to indicate total costs of different weights of merchandise within a given weight range at different prices per pound within a given price range, wherein the indicia on said web lengths are arranged in columns extending longitudinally thereof, the indicia carried by each of said web lengths including the entire given weight range expressed in ounces and pounds, together with total costs corresponding to only a part of the given price range; while the casing is provided, adjacent each sight opening and in proper registry with the corresponding total cost columns on the cooperating web length, with a scale indicating the corresponding prices per pound.

JOSEPH A. CHAUSSÉ.

REFERENCES CITED

The following references are of record in the file of this patent:

UNITED STATES PATENTS

| Number | Name | Date |
|---|---|---|
| 356,140 | Kurtz | Jan. 18, 1887 |
| 780,907 | Ocumpaugh | Jan. 24, 1905 |
| 1,136,673 | Heron | Apr. 20, 1915 |
| 1,311,100 | Thompson | July 22, 1919 |